US012803351B2

(12) United States Patent
Bauer et al.

(10) Patent No.: US 12,803,351 B2
(45) Date of Patent: Nov. 17, 2026

(54) ROTOR OF AN ELECTRIC MACHINE

(71) Applicant: Dr. Ing. h.c. F. Porsche Aktiengesellschaft, Stuttgart (DE)

(72) Inventors: David Bauer, Asperg (DE); Christian Koenen, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 278 days.

(21) Appl. No.: 18/479,851

(22) Filed: Oct. 3, 2023

(65) Prior Publication Data

US 2024/0120786 A1 Apr. 11, 2024

(30) Foreign Application Priority Data

Oct. 7, 2022 (DE) ..................... 10 2022 125 974.9

(51) Int. Cl.
*H02K 1/276* (2022.01)
*H02K 1/27* (2022.01)

(52) U.S. Cl.
CPC .................................... *H02K 1/276* (2013.01)

(58) Field of Classification Search
CPC ... H02K 1/276; H02K 1/2766; H02K 2213/03
USPC .................................................... 310/156.53
See application file for complete search history.

(56) References Cited

U.S. PATENT DOCUMENTS

| | | | | |
|---|---|---|---|---|
| 8,896,175 B2 * | 11/2014 | Cirani | H02K 1/2766 310/156.08 |
| 10,432,049 B2 * | 10/2019 | Saint-Michel | H02K 1/2766 |
| 2013/0026872 A1 * | 1/2013 | Cirani | H02K 1/2766 310/156.08 |
| 2013/0307363 A1 | 11/2013 | Sano et al. | |
| 2017/0040854 A1 * | 2/2017 | Saint-Michel | H02K 3/12 |
| 2018/0205276 A1 * | 7/2018 | Tangudu | H02K 1/2753 |
| 2020/0266677 A1 * | 8/2020 | Tago | H02K 1/165 |
| 2020/0303979 A1 | 9/2020 | Dajaku | |
| 2023/0412021 A1 * | 12/2023 | Koenen | H02K 15/03 |

FOREIGN PATENT DOCUMENTS

| | | | |
|---|---|---|---|
| CN | 114498977 | A | 5/2022 |
| DE | 102010010434 | A1 | 9/2011 |
| DE | 112012000667 | T5 | 10/2013 |
| DE | 102016219120 | A1 | 4/2018 |
| DE | 102019107452 | A1 | 9/2020 |
| DE | 102019117686 | A1 | 1/2021 |
| DE | 102019212256 | A1 | 2/2021 |
| DE | 102019215324 | A1 | 4/2021 |
| DE | 102019220203 | A1 | 6/2021 |
| DE | 102020103868 | A1 | 8/2021 |

(Continued)

*Primary Examiner* — Alex W Mok

(74) *Attorney, Agent, or Firm* — LEYDIG, VOIT & MAYER, LTD.

(57) ABSTRACT

A rotor of an electric machine, including rotor laminated cores, the rotor laminated cores including a multilayer magnetic system and surrounded by a drum. The multilayer magnetic system includes at least one triad with two magnets arranged in a V shape and a surface magnet. The surface magnet has a rectangular cross-section and is equipped with an additional rotor laminated core, which is arranged radially between the surface magnet and the drum.

13 Claims, 1 Drawing Sheet

(56) References Cited

FOREIGN PATENT DOCUMENTS

| | | | |
|---|---|---|---|
| DE | 102020115286 | A1 | 12/2021 |
| DE | 102020214035 | A1 | 5/2022 |
| WO | WO 2021225902 | A1 | 11/2021 |

* cited by examiner

ROTOR OF AN ELECTRIC MACHINE

CROSS REFERENCE TO RELATED APPLICATIONS

This application claims benefit to German Patent Application No. DE 10 2022 125 974.9, filed on Oct. 7, 2022, which is hereby incorporated by reference herein.

FIELD

The invention relates to a rotor of an electric machine.

BACKGROUND

From the German application DE 11 2012 000 667 T5, a rotor for a rotating electric machine is known, with permanent magnets arranged in a V shape, which are in a buried state, wherein a third permanent magnet is arranged perpendicular to the axial direction of a rotor core and has an elongated rectangular shape. From the German application DE 10 2016 219 120 A1, a rotor with magnetic elements arranged in a V shape is known. From the German application DE 10 2019 107 452 A1, a rotor with permanent magnets is known, of which a main magnet is configured as a surface magnet and an auxiliary magnet is configured as a buried spoke magnet. From the German application DE 10 2019 117 686 A1, a rotor device is known, having at least two magnetic units buried in a rotor core and at least one surface magnetic unit arranged between the rotor core and a drum.

SUMMARY

In an embodiment, the present disclosure provides a rotor of an electric machine, comprising rotor laminated cores, the rotor laminated cores comprising a multilayer magnetic system and surrounded by a drum. The multilayer magnetic system comprises at least one triad with two magnets arranged in a V shape and a surface magnet. The surface magnet has a rectangular cross-section and is equipped with an additional rotor laminated core, which is arranged radially between the surface magnet and the drum.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
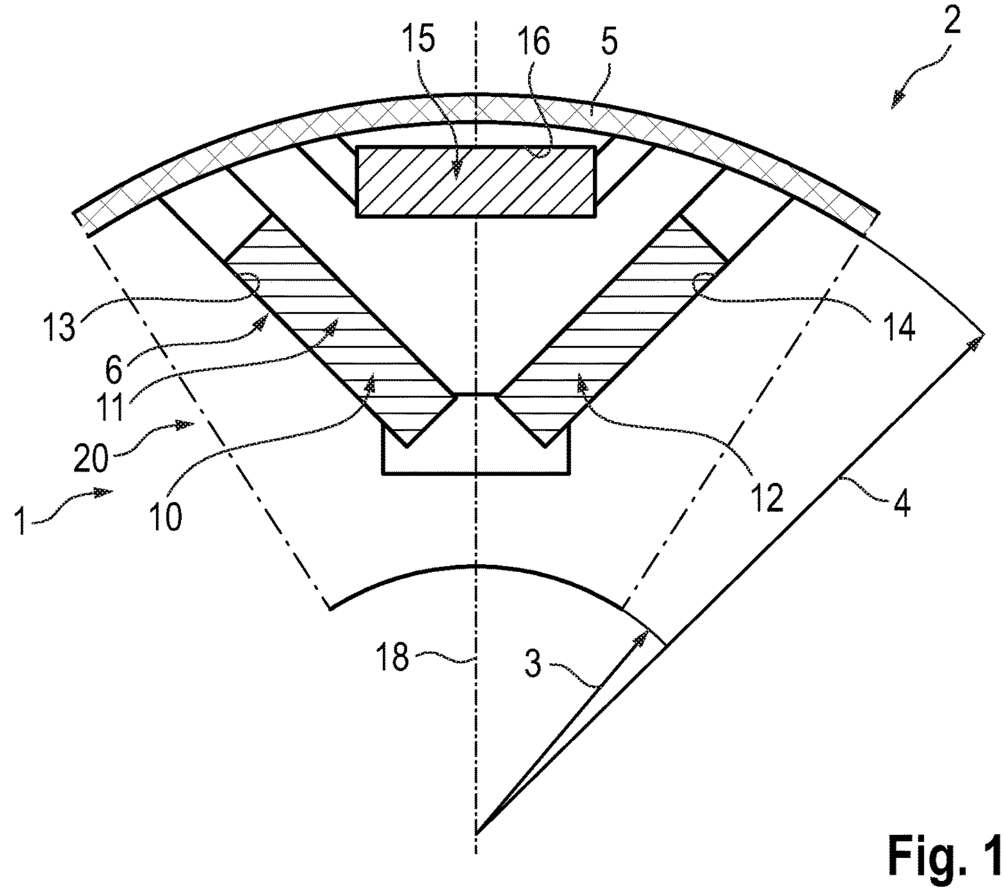
FIG. 1 illustrates a circular sector-like portion of a rotor of an electric machine in cross-section.

In an embodiment, the present invention simplifies the manufacture of a rotor of an electric machine.

In an embodiment, a rotor of an electric machine is provided, the rotor having rotor laminated cores comprising a multilayer magnetic system and surrounded by a drum, wherein the multilayer magnetic system comprises at least one triad with two magnetic units arranged in a V shape and a surface magnetic unit.

In the case of a rotor of an electric machine, having rotor laminated cores comprising a multilayer magnetic system and surrounded by a drum, wherein the multilayer magnetic system comprises at least one triad with two magnetic units arranged in a V shape and a surface magnetic unit, the above-mentioned problems are solved in that the surface magnetic unit has a rectangular cross-section and is equipped with an additional rotor laminated core, which is arranged radially between the surface magnetic unit and the drum. The rotor with the rotor sheet-metal parts and the multilayer magnetic system has an outer diameter, on which the rotor is completely surrounded by the drum. With the additional rotor laminated core between the surface magnetic unit and the drum, the manufacture of the disclosed rotor is significantly simplified. With the disclosed design of the rotor, costs of around twenty percent can be saved during manufacture compared to a conventional rotor with curved surface magnets. It is consciously accepted here that a torque that is achievable with the rotor will drop slightly during operation of the electric machine. Experiments carried out in the context of embodiments of the invention have found that the numerical torque only drops by about three to four percent, compared to a conventional magnet arrangement. The performance of the electric machine equipped with the disclosed rotor remains unchanged.

A preferred embodiment example of the rotor is characterized in that the additional rotor laminated core is combined with a star-shaped rotor laminated core and with a V-shaped rotor laminated core. In order to receive a triad consisting in each case of two magnetic units arranged in a V shape and the disclosed surface magnetic unit, the star-shaped rotor laminated core is combined with a V-shaped rotor laminated core and an additional rotor laminated core. The number of V-shaped rotor laminated cores and the additional rotor laminated cores is based on the respective number of triads with two magnetic units arranged in a V shape and one surface magnetic unit.

A preferred embodiment example of the rotor is characterized in that a V-shaped receiving space for the two magnetic units arranged in a V shape is formed between the star-shaped rotor laminated core and the V-shaped rotor laminated core. This simplifies the manufacture and assembly of the rotor.

A preferred embodiment example of the rotor is characterized in that the V-shaped receiving space opens radially outwardly and is only bounded by the drum. Bars that serve to hold the rotor laminated cores together in conventional rotors can advantageously be omitted. Advantageously, a star-shaped rotor laminated core is required for the rotor, and two rotor laminated cores are required per triad. The drum provides for the attachment of the otherwise loose parts, even at high speeds.

A preferred embodiment example of the rotor is characterized in that the V-shaped receiving space radially inwardly has the shape of a rectangle arranged parallel to a rectangle in which the surface magnetic unit is received. The two magnetic units arranged in a V shape project with their radially inner ends into the radially inner rectangle. The two rectangles simplify the manufacture of the two rotor laminated cores.

A preferred embodiment example of the rotor is characterized in that the rectangle in which the surface magnetic unit is received is part of a radially outwardly V-shaped receiving space. The radially outwardly V-shaped receiving space is radially inwardly bounded by the radially outward rotor laminated core and radially outwardly by the additional rotor laminated core. This arrangement further simplifies the manufacture and assembly of the disclosed rotor.

A preferred embodiment example of the rotor is characterized in that the radially outwardly V-shaped receiving space opens radially outwardly and is only bounded by the drum. Thus, by simple means, a stable arrangement of the triad with the two V-shaped magnetic units and the surface magnetic unit can be realized.

A preferred embodiment example of the rotor is characterized in that all magnetic units are rectangular. This further simplifies the manufacture and assembly of the rotor.

A preferred embodiment example of the rotor is characterized in that all magnetic units are the same size. This virtually eliminates errors during assembly.

A preferred embodiment example of the rotor is characterized in that the triad having the two magnetic units arranged in a V shape and the surface magnetic unit are intrinsically symmetrical in relation to a radial. Thus, by simple technical means of manufacturing, a powerful rotor can be realized for operation in an electric machine.

An embodiment of the invention optionally also relates to a rotor laminated core, in particular a rotor sheet-metal, and/or a magnetic system, in particular a magnet, for a rotor as described above. The aforementioned parts can be handled separately.

Further advantages, features, and details of embodiments of the invention arise from the following description, in which various embodiment examples of the invention are described in detail with reference to the drawing.

Figure 2:
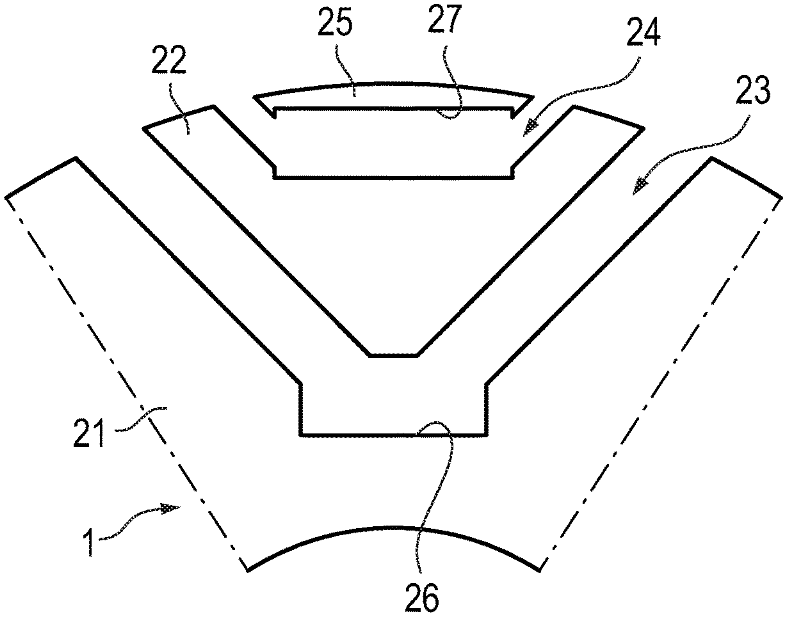
FIG. 2 illustrates the same representation as in FIG. 1 without a magnetic system and without a drum.

In FIGS. 1 and 2, a rotor 1 of an electric machine only indicated by a reference number 2 is shown in cross-section. In FIG. 1, the rotor 1 is shown with a multilayer magnetic system 6 and a drum 5. In FIG. 2, the magnetic system 6 and the drum 5 are not shown in order to better illustrate the arrangement of the rotor sheet-metal parts 20.

The electric machine 2 is a permanently energized synchronous machine. In such an electric machine, a magnetic field is generated in the rotor 1 with the magnetic system 6. The magnetic flux of the rotor 1 is always constant.

The multilayer magnetic system 6 comprises two magnetic units 11, 12 arranged in a V shape. Furthermore, the magnetic system 6 comprises a surface magnetic unit 15. The magnetic units 11, 12, and 15 are each arranged in multiple layers.

The three magnetic units 11, 12, and 15 are arranged in a triad 10 and are integrated into the rotor sheet-metal parts 20. The rotor sheet-metal parts 20 and the triad 10 having the magnetic units 11, 12, and 15 are held together by the drum 5. The drum 5 is formed from a fiber-reinforced plastic material, for example. The drum 5 can also be made from a metal.

As indicated by two arrows in FIG. 1, the rotor 1 has an inner diameter 3 and an outer diameter 4. At its outer diameter 4, the rotor 1 is completely surrounded by the drum 5.

In the circumferential direction, the rotor 1 not only comprises the triad 10 visible in FIG. 1. The rotor 1 also comprises multiple triads 10 evenly distributed in the circumferential direction. Each of these triads 10 is configured identically and is equipped with three magnetic units 11, 12, and 15.

The magnetic units 11 and 12 each have a rectangular cross-section 13 and 14. The magnetic units 11, 12 arranged in a V shape are arranged symmetrically in relation to a radial 18. For example, an angle between the two magnetic units 11 and 12 arranged in a V shape is about ninety degrees.

The surface magnetic unit 15 also has a rectangular cross-section 16. In relation to the radial 18, the surface magnetic unit 15 is intrinsically symmetrical. The surface magnetic unit 15 is arranged radially further outward than the two magnetic units 11, 12.

In FIG. 2, the arrangement of the rotor sheet-metal parts 20 is illustrated. In FIG. 2, three rotor laminated cores 21, 22, and 25 can be seen. In FIG. 2, the rotor laminated core 21 continues in the two opposite circumferential directions and is designed to be substantially star-shaped. The rotor laminated core 22 is substantially V-shaped.

Between the portion of the rotor laminated core 21 visible in FIG. 2 and the V-shaped rotor laminated core 22, a V-shaped receiving space 23 is formed for the two magnetic units 11 and 12. A further V-shaped receiving space 24 is formed between the V-shaped rotor laminated core 22 and the additional rotor laminated core 25.

The two V-shaped receiving spaces 23 and 24 each comprise a radially inward rectangle 26, 27. The radially outward rectangle 27 is used for receiving the surface magnetic unit 15. Radially inwardly, the rectangle 27 is bounded by the V-shaped rotor laminated core 22. Radially outwardly, the rectangle 27 is bounded by the additional rotor laminated core 25.

The two magnetic units 11 and 12 arranged in a V shape project into the rectangle 26 of the V-shaped receiving space 23 in the installed state as shown in FIG. 1. The rectangle 26 is radially inwardly bounded by the star-shaped rotor laminated core 21 and radially outward by the V-shaped rotor laminated core 22.

The two V-shaped receiving spaces 23 and 24 open radially outwardly and are only bounded by the drum 5 in the assembled state of the rotor 1.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

1 Rotor
2 Electric machine
3 Inner diameter
4 Outer diameter
5 Drum
6 Magnetic system
10 Triad
11 Magnetic unit
12 Magnetic unit
13 Rectangular cross-section
14 Rectangular cross-section
15 Surface magnetic unit
16 Rectangular cross-section
18 Radial
20 Rotor sheet-metal parts
21 Rotor laminated core
22 Rotor laminated core
23 V-shaped receiving space
24 V-shaped receiving space
25 Additional rotor laminated core
26 Rectangle
27 Rectangle

The invention claimed is:

1. A rotor of an electric machine, comprising rotor laminated cores, the rotor laminated cores comprising a multilayer magnetic system and surrounded by a drum, wherein the multilayer magnetic system comprises at least one triad with two magnets arranged in a V shape and a surface magnet, wherein the surface magnet has a rectangular cross-section and is equipped with an additional rotor laminated core, which is arranged radially between the surface magnet and the drum, wherein the additional rotor laminated core is combined with a star-shaped rotor laminated core and a V-shaped rotor laminated core, wherein a V-shaped first receiving space for the two magnets arranged in the V shape is formed between the star-shaped rotor laminated core and the V-shaped rotor laminated core, wherein the V-shaped first receiving space opens radially outward and is only bounded by the drum, wherein the V-shaped first receiving space comprises, radially inwardly, a shape of a rectangle arranged parallel to a rectangle in which the surface magnet is received, wherein the rectangle in which the surface magnet is received is part of a radially outwardly V-shaped second receiving space, wherein the radially outwardly V-shaped second receiving space opens radially outwardly and is only bounded by the drum, and wherein each of the two magnets arranged in the V shape protrude a radially inward end into the radially inward shape of the rectangle arranged parallel to the rectangle in which the surface magnet is received.

2. The rotor according to claim 1, wherein the V-shaped first receiving space radially inwardly has the shape of the rectangle arranged parallel to the rectangle in which the surface magnet is received.

3. The rotor according to claim 1, wherein all of the two magnets and the surface magnet are rectangular in form.

4. The rotor according to claim 1, wherein all of the two magnets and the surface magnet are the same size.

5. The rotor according to claim 1, wherein the at least one triad having the two magnets arranged in the V shape and the surface magnet are intrinsically symmetrical in relation to a radial.

6. The rotor according to claim 1, wherein the rotor comprises the two magnets arranged in the V shape and the surface magnet, and wherein the V shape and the cross-section of the rectangular cross-section are in a radial direction of the rotor.

7. The rotor according to claim 1, wherein the additional rotor laminated core abuts a radially inner surface of the drum.

8. The rotor according to claim 7, wherein the additional rotor laminated core comprises a radially outer surface that abuts the drum with a complimentary curvature to the drum and a radially inner surface that abuts a radially outer surface of the surface magnet.

9. The rotor according to claim 1, wherein the surface magnet is arranged radially further outward than the two magnets arranged in the V shape.

10. The rotor according to claim 1, wherein the radially outwardly opening V-shaped first receiving space is radially inwardly bounded by the rotor laminated core and radially outwardly bounded by a V-shaped rotor laminated core.

11. The rotor according to claim 1, wherein each of the two magnets arranged in the V shape and the surface magnet are a same size and a same rectangular shape.

12. The rotor according to claim 1, further comprising the V-shaped rotor laminated core arranged between the two magnets arranged in the V shape and the surface magnet, wherein the V-shaped rotor laminated core comprises two arms extending radially beyond the surface magnet and bounded by the drum.

13. The rotor according to claim 12, wherein the V-shaped rotor laminated core comprises an enclave that receives the surface magnet between the two arms.

* * * * *